US006052749A

United States Patent [19]
Purcell et al.

[11] Patent Number: 6,052,749
[45] Date of Patent: Apr. 18, 2000

[54] SYSTEM FOR FORMING AN INTELLIGENT I/O ($I_2O$)-AWARE DEVICE BY CONNECTING BOTH A PERIPHERAL CONTROL CONNECTOR HAVING AN I/O PROCESSOR MOUNTED AND NON-$I_2O$ DEVICE TO SAME BUS

[75] Inventors: Brian T. Purcell, Tomball; Pamela M. Cook, Spring; William F. Whiteman, Cypress, all of Tex.

[73] Assignee: Compaq Computer Corporation, Houston, Tex.

[21] Appl. No.: 08/970,367

[22] Filed: Nov. 14, 1997

[51] Int. Cl.$^7$ ............................ G06F 13/10; G06F 13/20; G06F 9/02; G06F 9/44
[52] U.S. Cl. ............................ 710/71; 710/63; 710/102; 710/64; 709/302; 395/500.48
[58] Field of Search .................................. 710/62, 71, 63, 710/102, 64; 395/500, 500.48; 709/302

[56] References Cited

U.S. PATENT DOCUMENTS

| | | | |
|---|---|---|---|
| 5,440,755 | 8/1995 | Harwer et al. | 710/101 |
| 5,604,871 | 2/1997 | Pecone | 710/101 |
| 5,793,987 | 8/1998 | Quackenbush et al. | 710/100 |
| 5,802,278 | 9/1998 | Isfeld et al. | 709/249 |

OTHER PUBLICATIONS

Mendel, Brett; "Server I/O all set to flow"; *Lantimes*, Oct. 27, 1997, vol. 14, Issue 22; cover page and p. 31.
Briggs, Chris; "Smarter and Faster I/O for Servers"; CORE: Operating Systems; *Byte*, May 1, 1996, Vol. 2, No. 5.
Thompson, Tom; "I2O Beats I/O Bottlenecks"; *Byte*, Aug. 1997, pp. 85, 86 and 3 additional pages.
I2O Introduction; Technology Backgrounder; Aug. 13, 1997; http://www.i2osig.org/Architecture/TechBack.html.
i960®RP I/O Processor—the I2O SIG site; http://134.134.214.1/design/iio/i2osig.html; Feb. 6, 1998.
"Welcome to the I2O SIG® Web Site!"; http://www.i2osig.org; Feb. 6, 1998.
"About I2O Technology"; http://www.i2osig.org/Architecture; Feb. 6, 1998.
"Technology Backgrounder"; http://www.i2osig.org/Architecture/TechBank.html; Feb. 6, 1998; 6 pages.
"Questions and Answers"; http://www.i2osig.org/Architecture/QandA.html; Feb. 6, 1998; 4 pages.
"I2O® Specifications For Non–Members"; http://www.i2osig.org/Architecture/GetSpec.html; Feb. 6, 1998.
Amdahl, Carlton G.; "I2O Future Directions"; http://www.i2osig.org; Jun. 1996; 12 pages.
Goble, Scott, et al.; "Intelligent I/O Architecture"; http://www.i2osig.org; Jun. 1996; 22 pages.
"Press Releases and Clips"; http://www.i2osig.org/Press; Feb. 6, 1998; 4 pages.
Listing of Press Releases ; http://altavista.digital.com/cgi–bin/quer . . . =21%2FMar%2F86&d1=&search.x=46&search.y=6; Feb. 6, 1998; 2 pages.
Crothers, Brooke; "Intel server chip gets big backing", Oct. 7, 1997; http://www.news.com/News/Item/0,4,14962,00.html; Feb. 6, 1998.
"HP Demonstrates Commitment to I2O Standard With New I2O Disk–array Controller"; *Hewlett Packard*; Press Release, Atlanta, Oct. 8, 1997; http://hpcc920.external.hp.com/pressrel/oct97/08oct97b.html; Feb. 6, 1998;2 pages.
"HP Demonstrates Commitment to I2O Standard With New I2O Disk–array Controller"; *Hewlett Packard*; Press Release, Atlanta, Oct. 8, 1997; http://hpcc920.external.hp.com/pressrel/oct97/08oct97b.html; Feb. 6, 1998; 2 pages.
Robert A. Peck; "Expanding Your Apple's Application's"; Guide to the Apple; BYTE; pp. A45–A47, A122–A126, Dec. 1984.

*Primary Examiner*—Thomas C. Lee
*Assistant Examiner*—Ilwoo Park
*Attorney, Agent, or Firm*—Jenkens & Gilchrist, P.C.

[57] ABSTRACT

Apparatus, and an associated method, converts a conventional computer peripheral device, such as an I/O (input/output) subsystem into an $I_2O$-aware device. An IOP mounted upon a connector card is connected to a computer bus to which the conventional computer peripheral device is connected. Once connected, the IOP, together with the conventional computer peripheral device form an $I_2O$-aware device.

7 Claims, 3 Drawing Sheets

SYSTEM FOR FORMING AN INTELLIGENT I/O ($I_2O$)-AWARE DEVICE BY CONNECTING BOTH A PERIPHERAL CONTROL CONNECTOR HAVING AN I/O PROCESSOR MOUNTED AND NON-$I_2O$ DEVICE TO SAME BUS

BACKGROUND OF THE INVENTION

1. Field of the Invention

The present invention relates generally to a computer system having a computer peripheral device, such as an I/O (input/output) subsystem. More particularly, the present invention relates to apparatus, and an associated method, by which to convert the computer peripheral device into an $I_2O$- (intelligent input/output) aware device.

The peripheral device is converted into an $I_2O$-aware device by connecting an IOP (input/output processor) mounted upon an IOP card, or other connector, to a computer bus to which the computer peripheral device also is connected. In one implementation, the computer peripheral device is a PCI device coupled to a PCI bus and the IOP card is coupled to the PCI bus. By merely plugging the IOP card into a PCI socket of the PCI bus, the peripheral device is converted into an $I_2O$-aware device.

A conventional, non $I_2O$-aware computer peripheral device need not be discarded and replaced with an $I_2O$-aware peripheral device. Rather, an existing, non-$I_2O$-aware, computer peripheral device is converted into an $I_2O$-aware device merely by connecting the separate, IOP card to the computer bus. Also, replacement of the IOP card with a substitute card, such as to upgrade the IOP with a more powerful device, is effectuated merely by unplugging one IOP card out of connection with the computer bus and substituting a substitute IOP card therefor. Furthermore, the IOP card is scalable, permitting more than one computer peripheral device to be converted into an $I_2O$-aware device.

2. Description of Related Art

Computer systems have achieved wide usage in modern society. During operation, a computer system processes and stores data at a speed and at a level of accuracy many times that which can be performed manually. Successive generations of computer systems have permitted ever-increasing amounts of data to be processed at ever-increasing rates.

Computer systems are sometimes operated as stand-alone devices or connected together by way of network connections, typically together with a network server, to form a computer network. When networked together, communication between the separate computer systems is possible. Files and other data, stored or generated at one computer system, can be transferred to another computer system.

A conventional computer system typically includes one or more CPUs (central processing units) capable of executing algorithms forming applications and a computer main memory. Peripheral devices, both those embedded together with a CPU or constructed to be separate therefrom, also typically form portions of a conventional computer system. Computer peripheral devices include, for instance, video graphics adapters, LAN (local area network) interfaces, SCSI (small computer system interface) bus adapters, and mass storage devices, such as disk drive assemblies.

A computer system further typically includes computer buses which permit the communication of data between portions of the computer system. For instance, a host bus, a memory bus, at least one high-speed, a local peripheral expansion bus, and one or more additional peripheral buses form portions of a typical computer system.

A peripheral bus is formed, for instance, of an SCSI bus, an EISA (extension to industry standard architecture) bus, an ISA (industry standard architecture) bus, or a PCI (peripheral component interface) bus. The peripheral bus forms a communication path to and from a peripheral device connected thereto. The computer system CPU, or a plurality of CPUs in a multi-processor system, communicates with a computer peripheral device by way of a computer bus, such as one or more of the computer buses noted above.

Data is communicated to and from a computer peripheral device by way of a computer bus. A computer peripheral, depending upon its data transfer speed requirements, is connected to an appropriate computer bus, typically by way of a bus bridge that detects required actions, arbitrates, and translates both data and addresses between the various buses.

A computer peripheral device forming a portion of a single computer system might well be supplied by a manufacturer other than the manufacturer of the computer CPU. If the computer system contains more than one peripheral device, the peripheral devices might also be supplied by different manufacturers. Furthermore, the computer system may be operable pursuant to any of several different operating systems. The various combinations of computer peripheral devices and computer operating systems of which a computer system might be formed quickly becomes quite large.

Software drivers are typically required for each computer peripheral device to effectuate its operation. A software driver must be tailored to be operable together with the operating system pursuant to which the computer system is operable. A computer peripheral device must therefore have associated therewith a software driver to be operable together with any of the several operating systems pursuant to which the computer system might be operable. A multiplicity of software drivers might have to be created for a single computer peripheral to ensure that a computer peripheral device is operable together with any of the different operating systems.

The complexity resulting from such a requirement has led, at least in part, to the development of an $I_2O$ (intelligent input/output) standard specification. The $I_2O$ standard specification sets forth, inter alia, standards for an I/O device driver architecture that is independent of both a specific peripheral device being controlled and the operating system of the computer system at which the device driver is to be installed.

In the $I_2O$ standard specification, the portion of the driver that is responsible for managing the peripheral device is logically separated from the specific implementation details for the operating system in which is to be installed. By doing so, the part of the driver that manages the peripheral device becomes portable across different computer and operating systems. The $I_2O$ standard specification also generalizes the nature of communication between the host computer system and peripheral hardware, thus providing processor and bus technology independence.

Construction of computer systems aware with the $I_2O$ standard specification facilitates formation of a computer system having component portions supplied by different suppliers while also assuring that the different component portions of the computer system shall be operable when connected theretogether. Upgrading and conversion of an existing computer system to be $I_2O$ aware assures that subsequent upgrading of the computer system shall be able to be effectuated simply.

While additional applications can be installed at a computer system to be executed by the CPU of the computer system, thereby to make the computer CPU $I_2O$-aware, a conventional computer peripheral device cannot so easily be converted. A computer peripheral device which does not include a processor cannot analogously become $I_2O$-aware.

A need exists, therefore, to provide a manner by which to convert an existing, conventional computer peripheral device to be $I_2O$-aware.

It is in light of this background information related to computer systems that the significant improvements of the present invention have evolved.

SUMMARY OF THE INVENTION

The present invention, accordingly, advantageously provides apparatus, and an associated method, for converting a computer peripheral device of a computer system into an $I_2O$-aware device. Through operation of an embodiment of the present invention, the computer peripheral device is converted into an $I_2O$-aware device by connecting an IOP (input/output processor) mounted upon an IOP card to a computer bus to which the computer peripheral device is also connected.

$I_2O$ messaging can thereafter be effectuated between the IOP and a CPU of the computer system. $I_2O$ messaging can similarly also be effectuated between the IOP and another IOP associated with another computer peripheral device. Once suitably connected, the IOP is operable to control the operation of the computer peripheral device, responsive, for instance, to the $I_2O$ messaging received at the IOP.

A conventional, non $I_2O$-aware, computer peripheral device of a computer system need not be entirely replaced when upgrading the computer system to be $I_2O$-aware. An IOP card is, instead, connected to the computer bus to which the computer peripheral device is also connected. Thereby, the IOP together with the conventional, computer peripheral device forms an $I_2O$-aware device. $I_2O$ messaging to and from the $I_2O$-aware device, so-formed, is thereafter possible.

As the card upon which the IOP is mounted is releasably connectable to the computer bus to which the computer peripheral device is also connected, the IOP can be replaced and upgraded, when desired, such as with a more powerful IOP merely by replacing the IOP card with a substitute card containing the substitute IOP.

The IOP mounted upon the IOP card further is scalable, thereby to permit more than one computer peripheral device to be converted into an $I_2O$-aware device.

In one aspect of the present invention, the conventional, computer peripheral device is connectable to the computer system by way of a PCI bus by plugging a PCI card forming a portion of the peripheral device into a socket of the PCI bus. An IOP is mounted upon a separate PCI card and the PCI card upon which the IOP is mounted is plugged into another socket of the PCI bus. The IOP and the computer peripheral device together form an $I_2O$-aware device. $I_2O$ messaging to and from the IOP with another device, such as an OSM (operating system-specific module) of a CPU or another IOP is thereafter permitted.

In these and other aspects, therefore, control apparatus, and an associated method, is provided for a computer peripheral device. The computer peripheral device is connectable to a computer system by way of a computer bus to form a portion thereof. The computer peripheral device includes computer peripheral circuitry disposed upon a computer peripheral connector connectable to the computer bus. A peripheral control connector is connectable to the computer bus and a peripheral control processor is mounted at the peripheral control connector. The peripheral control processor is coupled to the computer peripheral circuitry disposed upon the computer peripheral connector to control operation of the computer peripheral device when the peripheral control connector and the computer peripheral connector are connected to the computer bus.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
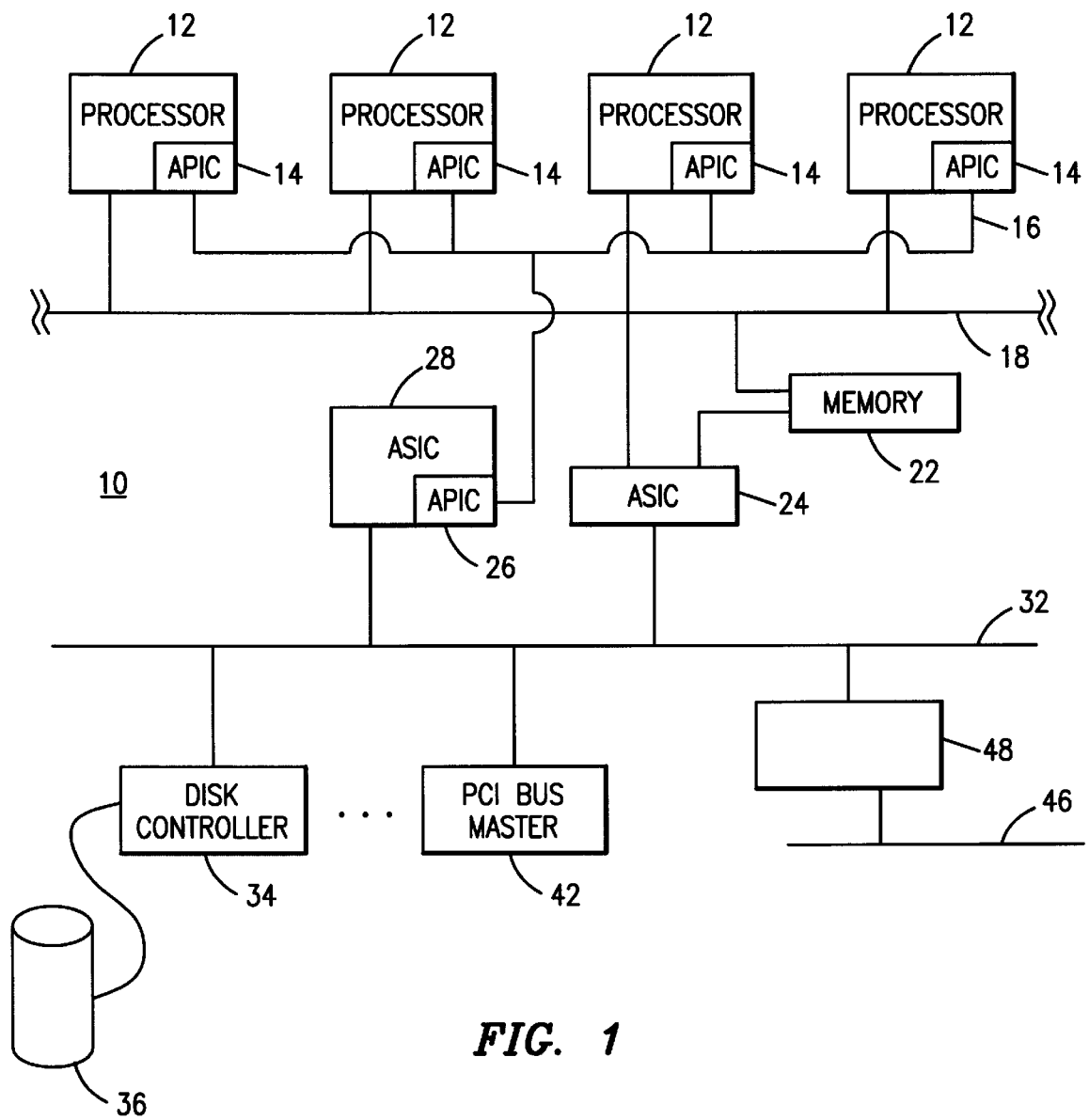
FIG. 1 illustrates a functional block diagram of a computer system having a computer peripheral device which can be converted into an $I_2O$-aware device during operation of an embodiment of the present invention.

Referring first to FIG. 1, an exemplary computer system, shown generally at 10, includes a multiple number of processors 12 coupled in parallel to permit processing functions to be performed by individual ones of such processors concurrently. A multi-processor computer system, of which the computer system 10 is exemplary, advantageously permits computer tasks to be performed in parallel, thereby increasing the speed at which computer tasks can be completed. The computer system 10 is representative, e.g., of a computer server.

A local APIC (advanced programmable interrupt controller) 14 is associated with each of the processors 12. In the exemplary embodiment, the local APICs are located on the same chip as that upon which the processor 12 associated with the respective APIC is also located.

Each of the local APICs is coupled together by way of an APIC bus 16. In the exemplary embodiment, the APIC bus 16 is formed of a three-wire bus including two data lines and a clock line upon which a clock signal is generated.

The computer system 10 is further shown to include a processor bus 18 which is also coupled to the processors 12. The processor bus 18 is utilized during normal operation of the computer system 10 to communicate data generated during normal operation of the computer system. Data is communicated, e.g., between the processors 12 and also other devices, such as a memory element 22 and a special-purpose ASIC (application specific integrated circuit) 24.

The APIC bus 16 is dedicated for the communication of interrupt messages and responses thereto. Inter-processor interrupt (IPI) messages are generated by individual ones of the local APICs and are communicated to selected others of the local APICs when the attention of one or more of the processors is required to address a particular system condition. The APIC bus 16 further extends to an I/O APIC (input/output advanced programmable interrupt controller) 26 associated with another circuit device, here an ASIC 28.

The local APICs 14 are operable to perform two primary functions for the processor. First, the local APICs 14 process local external interrupts that the processor 12 associated therewith receives at its interrupt pins (not shown in the FIG.) and local internal interrupts generated during execution of system software. The local APICs 14 communicate, by way of the APIC bus 16, with the external I/O APIC 26. The I/O APIC 26 receives external interrupt events from the system and inter-processor interrupts from the processors 12. The APIC 26 also distributes inter-processor interrupts to the processors on the system bus.

The computer system 10 is further shown to include a PCI (peripheral component interconnect/interface) bus 32. Peripheral component devices, such as the disk controller 34 are coupled to the PCI bus 32. The disk controller 34 controls operation of one or more disk drives 36. While not separately shown, other peripheral component devices are similarly coupled to the PCI bus 32. A PCI bus master or initiator 42 is further coupled to the PCI bus 32. The bus master 42 is operable to initiate and control communications upon the PCI bus 32. The ASIC 28 is further coupled to the PCI bus 32.

The computer system includes further elements and buses of which the EISA (extended industry standard architecture) bus 46 is exemplary. The EISA bus 46 is here shown to be coupled to a peripheral component 48 which, in turn, is also coupled to the PCI bus 32.

An embodiment of the present invention permits the conversion of a conventional, computer peripheral device into an $I_2O$-aware device. For instance, if the disk controller 34, and disk drive 36 associated therewith, is a non $I_2O$-aware device, an embodiment of the present invention is advantageously utilized to convert the controller 34 and associated disk drive 36 into an $I_2O$-aware device. Other conventional peripheral component devices, similarly coupled to the PCI bus 32, can also be converted into $I_2O$-aware devices. While the exemplary implementation described below relates to the conversion of a device coupled to the PCI bus 32 into an $I_2O$-aware device, other peripheral component devices coupled to other buses, and constructed to be operable together with other I/O subsystem architectures, similarly can be converted to form $I_2O$-aware devices.

Figure 2:
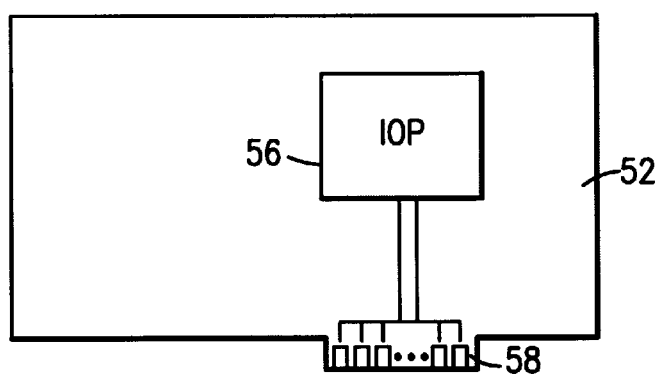
FIG. 2 illustrates a functional block diagram of an IOP (input/output processor) card of an embodiment of the present invention.

FIG. 2 illustrates the apparatus, shown generally at 50, of an embodiment of the present invention. The apparatus 50, in the exemplary implementation, comprises a PCI card 52 and an IOP (input/output processor) 56 mounted thereon. Other circuitry, also disposed upon or otherwise connected to the card 52, is not shown for purposes of simplicity. In the exemplary embodiment, the IOP 56 comprises a 486-based microprocessor. In other implementations, other processing devices are alternately utilized.

The IOP 56 is suitably connected by way of circuit connections to appropriate ones of the pins 58 formed on the PCI card 52, in a conventional manner. When so-mounted at the card 52, connection of the card 52 into a PCI socket of a PCI bus, such as the PCI bus 32 shown in FIG. 1, is easily effectuated merely by inserting the card into the socket. Once suitably connected to the PCI bus, the IOP 56 becomes operable to form, together with a conventional, peripheral device, an $I_2O$-aware device. $I_2O$ messaging generated by an application, such as an OSM (operating system service module) executed by one of the processors 12, is received by the IOP 56 and appropriate control is exerted over the conventional computer peripheral device associated together therewith.

The IOP 56 is similarly operable to generate $I_2O$ messaging for communication back to the processor 12 or another IOP of another $I_2O$-aware device, coupled in a peer-to-peer relationship therewith.

Because the card 52 is pluggable into a plugged connection at a socket of a PCI bus, the card 52 can similarly be easily removed out of such connection and replaced with another card 52 to upgrade, as appropriate, operation of the $I_2O$-aware device formed therefrom. In one embodiment, the IOP 56 is operable together with more than one peripheral device to make such more than one such peripheral device $I_2O$-aware. Thereby, the card 52 additionally provides the advantage of scalability.

Figure 3:
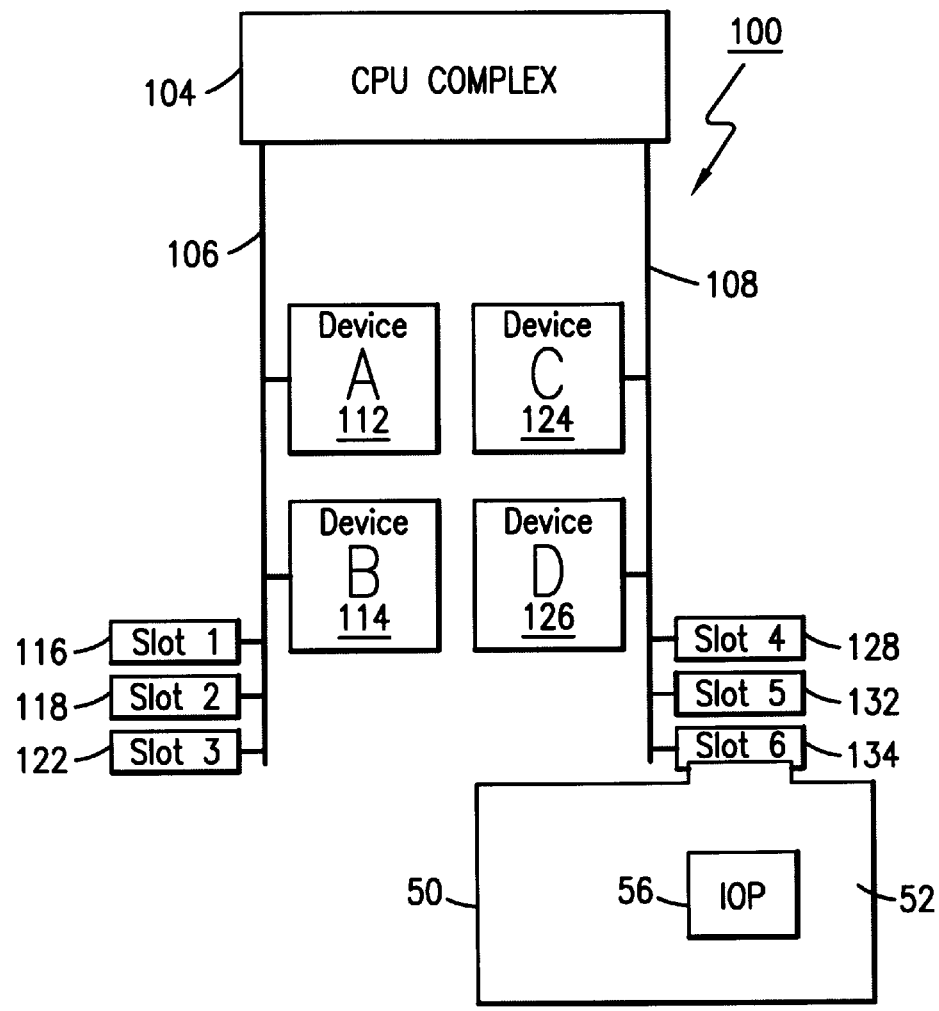
FIG. 3 illustrates a functional block diagram of a computer system in which the PCI card shown in FIG. 2 is connected to convert a computer peripheral device into an $I_2O$-aware device.

FIG. 3 illustrates a computer system, shown generally at 100, in which the apparatus 50 shown in FIG. 2 forms a portion. The computer system 100 includes a CPU complex 104. The CPU complex 104 is analogous, inter alia, to the processors 12 of the multi-processor computer system 10 shown previously in FIG. 1.

The computer system 100 is here shown to include two PCI buses: first and second PCI buses 106 and 108. The first PCI bus 106 is here shown to be coupled to embedded devices 112 and 114 and to include three sockets forming slots 116, 118, and 122. The second PCI bus 108 is coupled to two embedded devices 124 and 126. The second PCI bus 108 also includes three slots forming sockets 128, 132, and 134.

In conventional manner, the slots 116, 118, 122, 128, 132, and 134 are all capable of receiving a PCI card forming a portion of a computer peripheral device. The card 52 forming a portion of the apparatus 50 shown in FIG. 2 is inserted into the slot 134 to be connected to the PCI bus 108 thereby.

Another PCI card forming a portion of a computer peripheral device, such as the disc controller 34 coupled to the disc drive assembly 36 shown in FIG. 1, is controlled by the IOP 56 mounted upon the card 52. $I_2O$ messaging generated by applications executable by the CPU complex 104 are received by the IOP 56. Responsive thereto, operation of the computer peripheral device which, together with the IOP 56, forms an $I_2O$-aware device, is effectuated. Similarly, messaging generated by the IOP 56 through operation of the $I_2O$-aware device so-formed, is communicated back to the CPU complex 104. Because of the scaling permitted by the IOP 56, additional conventional, peripheral devices connected to the slots 128 or 132 similarly can be converted into $I_2O$-aware devices together with the IOP 56.

Thereby, a conventional, peripheral device is converted to become an $I_2O$-aware device merely by plugging the card 52 into an available socket forming one of the slots. Because of the ease with which the card 52 is connectable into a circuit connection, the card similarly can be removed and replaced, such as to upgrade the IOP, as appropriate.

Figure 4:
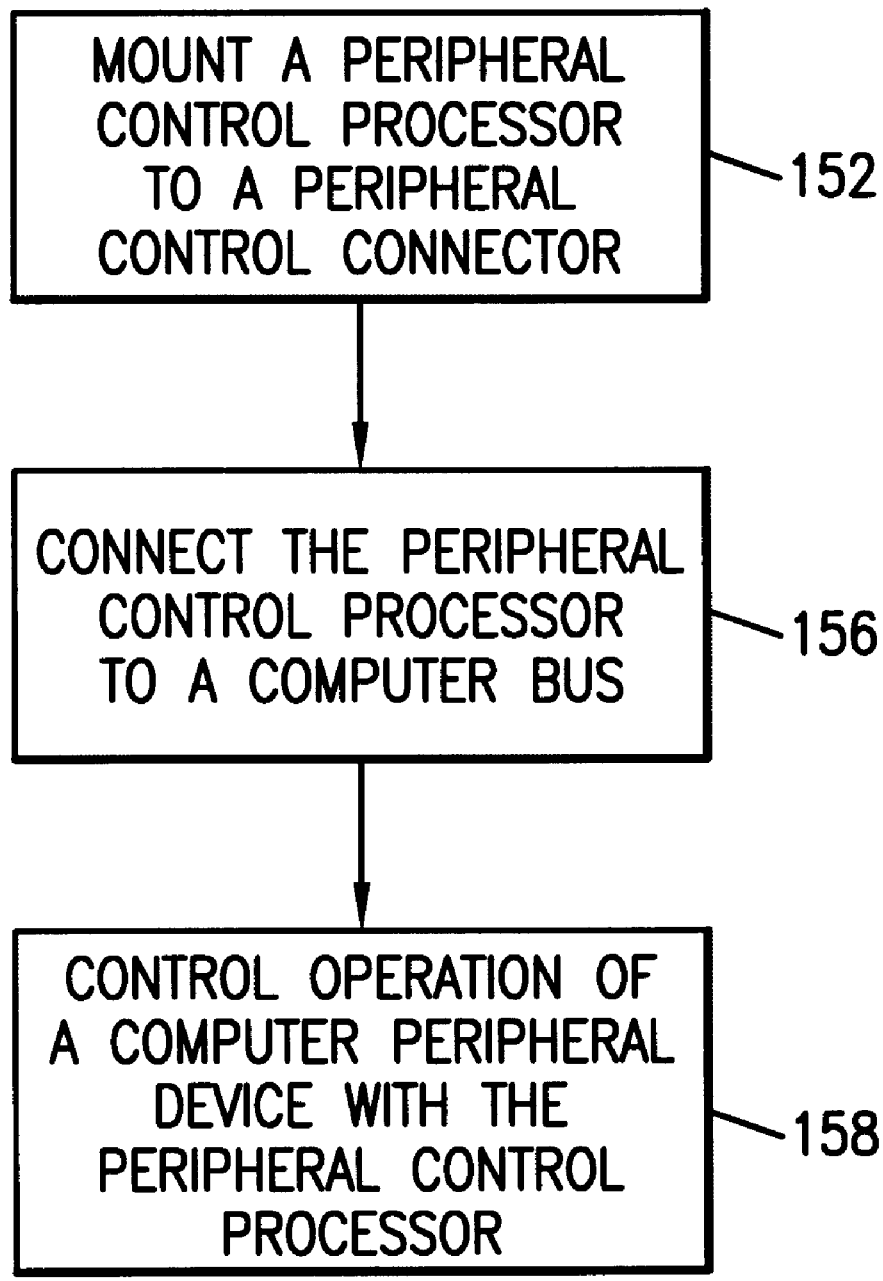
FIG. 4 illustrates a method listing the method steps of the method of an embodiment of the present invention.

FIG. 4 illustrates a method flow diagram, shown generally at 150 of an embodiment of the present invention. The method 150 controls operation of a computer peripheral device connectable to a computer system by way of a computer bus. The computer peripheral device includes computer peripheral circuitry disposed upon a computer peripheral connectable to the computer bus.

First, and as indicated by the block 152, a peripheral control processor is mounted to a peripheral control connector. Then, and as indicated by the block 156, the peripheral control connector is connected to the computer bus.

And, as indicated by the block 158, operation of the computer peripheral device is controlled with the peripheral control processor when the computer peripheral connector also is connected to the computer bus.

Operation of an embodiment of the present invention thereby simply and easily converts a conventional, peripheral device into an $I_2O$-aware device. A conventional computer peripheral device need not be discarded and replaced with an $I_2O$-aware peripheral device when a computer system is upgraded to become $I_2O$-aware. Rather, the existing peripheral device is converted into an $I_2O$-aware device merely by connecting a separate IOP card to a computer bus. The IOP card is easily inserted and removed into and out of connection with the computer bus. Thereby, replacement of the IOP card with a substitute card, such as to upgrade the IOP with a more powerful IOP, is effectuated merely by unplugging one IOP card out of connection with the computer bus and substituting a substitute IOP card therefor. Furthermore, the IOP card is scalable, permitting more than one computer peripheral device to be converted into an $I_2O$-aware device.

The previous descriptions are of preferred examples for implementing the invention, and the scope of the invention should not necessarily be limited by this description. The scope of the present invention is defined by the following claims.

What is claimed is:

1. Control apparatus for a computer peripheral device connectable to a computer system by way of a computer bus to form a portion thereof, the computer peripheral device having computer peripheral circuitry disposed upon a computer peripheral connector connectable to the computer bus, said control apparatus comprising:

a peripheral control connector connectable to the computer bus;

a peripheral $I_2O$ (intelligent input/output) input/output control processor mounted at said peripheral control connector, said peripheral control processor coupled to the computer peripheral circuitry disposed upon the computer peripheral connector to control operation of the computer peripheral device when said peripheral control connector and the computer peripheral connector are connected to the computer bus; and wherein the computer peripheral device, when the computer peripheral connector is connected to the computer bus, and said peripheral control processor mounted at said peripheral control connector, when said peripheral control connector is connected to the computer bus, together form an $I_2O$-aware peripheral device.

2. The control apparatus of claim 1 wherein the computer system includes an OSM (operating system service module) and wherein the $I_2O$-aware device form a portion of a DDM (downloadable driver module).

3. The control apparatus of claim 2 wherein the OSM generates $I_2O$-aware messages for communication to the $I_2O$-aware device, and wherein said $I_2O$ input/output processor receives the $I_2O$-aware messages communicated thereto by the OSM.

4. The control apparatus of claim 2 wherein said $I_2O$ input/output processor generates $I_2O$-aware messages for communication to the OSM.

5. The control apparatus of claim 1 wherein the computer bus comprises a PCI (peripheral component interface) bus and wherein said peripheral controL connector comprises a PCI card.

6. A method for controlling operation of a computer peripheral device connectable to a computer system by way of a computer bus to form a portion thereof, the computer peripheral device having computer peripheral circuitry disposed upon a computer peripheral connector connectable to the computer bus, said method comprising the steps of:

mounting a peripheral $I_2O$ (intelligent input/output) input/output control processor to a peripheral control connector;

connecting the peripheral control connector to the computer bus;

controlling operation of the computer peripheral device with the peripheral control processor when the computer peripheral connector also is connected to the computer bus; and wherein said step of connecting the peripheral control connector, when the computer peripheral connector is connected to the computer bus, causes formation of an $I_2O$-aware device, formed of the computer peripheral device and the peripheral control processor mounted upon the peripheral control connector.

7. The method of claim 6 wherein the computer bus comprises a PCI (peripheral component interface) bus, wherein the peripheral control connector to which the peripheral control processor is mounted during said step of mounting comprises a PCI card and wherein said step of connecting comprises connecting the PCI card to the PCI bus.

* * * * *